United States Patent [19]

Chang

[11] Patent Number: 5,181,113
[45] Date of Patent: Jan. 19, 1993

[54] METHOD OF STORING AND EDITING DATA IN A TELEVISION SYSTEM AND APPARATUS THEREFOR

[75] Inventor: Dong H. Chang, Kumi, Rep. of Korea

[73] Assignee: Goldstar Co., Ltd., Seoul, Rep. of Korea

[21] Appl. No.: 698,202

[22] Filed: May 10, 1991

[30] Foreign Application Priority Data

May 10, 1990 [KR] Rep. of Korea ............ 90-6602

[51] Int. Cl.⁵ ............................................. H04N 7/12
[52] U.S. Cl. ................................... 358/142; 358/147; 340/728
[58] Field of Search ............... 358/142, 147, 188, 146, 358/183; 340/728, 750; 395/141

[56] References Cited

U.S. PATENT DOCUMENTS

| | | | |
|---|---|---|---|
| 4,595,951 | 6/1986 | Filliman | 358/146 |
| 4,881,067 | 11/1989 | Watanabe et al. | 395/141 |
| 4,933,764 | 6/1990 | Kinghorn | 358/142 |
| 5,003,304 | 3/1991 | Takinomi et al. | 340/748 |
| 5,036,394 | 7/1991 | Morii et al. | 358/147 |

Primary Examiner—John K. Peng
Assistant Examiner—Glenton B. Burgess
Attorney, Agent, or Firm—Finnegan, Henderson, Farabow, Garrett and Dunner

[57] ABSTRACT

A TV system with the functions of Teletext comprising a TV set and a teletext receiving process section, which performs the editing and storing of data received through an antenna in order of determining whether a key interrupt indicates TV mode, teletext mode or memo data mode, so that if the TV mode or the teletext mode is indicated, the associated function is performed according to a given process, performing the corresponding program stored at a memory if the first step indicates the data edit and storing mode, performing each of the programs for storing, fetching and editing the memo data, performing the program for storing the memo data, indicating cursor and switching character mode if the third step indicates the first switching of the TV mode or the teletext mode to the memo data mode, switching the TV set into the TV mode by detecting a memo fetching key if the memo data edited and stored by the user in the third step is indicated on the TV screen, and storing memo identifications and memo data at the memory if the third step indicates memo storing mode.

46 Claims, 13 Drawing Sheets

FIG. 10

| ENGLISH CHARACTERS ||||| GERMAN CHARACTERS ||
| FONT | ADDRESS | FONT | ADDRESS | FONT | ADDRESS |
|---|---|---|---|---|---|
| A | 00 | ‰ | 0F | A | 29 |
| B | 10 | & | 11 | B | 2A |
| C | 20 | * | 12 | C | 2B |
| D | 30 | ( | 13 | D | 2C |
| E | 40 | ) | 14 | E | 2D |
| F | 50 | < | 15 | F | 2E |
| G | 60 | > | 16 | G | 2F |
| H | 70 | [ | 17 | H | 31 |
| I | 80 | ] | 18 | I | 32 |
| J | 90 | — | 19 | J | 33 |
| K | A0 | - | 1A | K | 34 |
| L | B0 | + | 1B | L | 35 |
| M | C0 | = | 1C | M | 36 |
| N | D0 | / | 1D | N | 37 |
| O | E0 | \ | 1E | O | 38 |
| P | F0 | . | 1F | P | 39 |
| Q | 01 | ' | 21 | Q | 3A |
| R | 02 | , | 22 | R | 3B |
| S | 03 | : | 23 | S | 3C |
| T | 04 | ; | 24 | T | 3D |
| U | 05 | " | 25 | U | 3E |
| V | 06 | " | 26 | V | 3F |
| W | 07 | ? | 27 | W | 41 |
| X | 08 | ^ | 28 | X | 42 |
| Y | 09 | | | Y | 43 |
| Z | 0A | | | Z | 44 |
| § | 0B | | | ß | 45 |
| ! | 0C | | | Ö | 46 |
| # | 0D | | | Ä | 47 |
| $ | 0E | | | Ü | 48 |

METHOD OF STORING AND EDITING DATA IN A TELEVISION SYSTEM AND APPARATUS THEREFOR

TECHNICAL BACKGROUND

The present invention relates to a television system with the functions of Teletext that allow the user to store and edit messages to display on the TV screen as desired, and to a method of storing and editing data thereby.

Referring to FIG. 1, a television system with the functions of teletext comprises TV set A and teletext receiving process section B, in which TV set A is provided with an antenna, tuning portion 2 including a tuner and the controller thereof, first u-processor 3, luminance and chrominance signal processor 4, R.G.B. signal switching circuit 5 and CRT 6. Teletext receiving process section B is provided with data sync separating and slicing means 7, teletext signal processor 8, video signal generating means 9, memory 10, program RAM 11, second u-processor 12, programmed ROM 13 for processing teletext signals and signal generating portion 14.

TV set A may be simillar to a conventional TV set with respect to TV signal processing manners, and therefore will not be further described.

Data sync separating and slicing means 7 of teletext receiving process section B separates synchronizing pulses from composite video signals outputted from tuning portion 2, and converts teletext data carried in vertical blanking interval (VBI) of synchronizing signals into digital signals. Teletext signal processor 8 receives composite video synchronizing signals and teletext digital data of data sync separating and slicing means 7, stores data in the form of First-in and First-out (FIFO) into memory under the control of second u-processor 12 as well as controls to be able to store data at program RAM 11 and receives key signals RXD and S.CLOCK of remote control 1 at first u-processor 3 to carry out the program for transferring key signals to second processor 12.

Video signal generating means 9 has a function of automatically refreshing memory 10 referred to as a program RAM, stores video information commanded by second u-processor 12 at memory 10, and converts video information of memory 10 into analog signals so as to display it on the screen of CRT 6 according to internally generated horizontal and vertical synchronizing signals. Memory 10 stores one page of information to currently be displayed on TV screen.

Program RAM 11 stores temporary information (parameters) directly accessed by second u-processor 12. Programmed ROM 13 for processing teletext signals stores programs for controlling teletext signals. Signal generating portion 14 combines on screen display signals (OSD signals) of first u-processor 3 with chrominance signals of video signal generating means 9 so as to apply combined signals to R.G.B. signal switching circuit 5 in TV set A.

Signals from remote control 1 are transmitted to first u-processor 3 that interprets them and then applies them as key signals through communication lines RXD and S.CLOCK to teletext signal processor 8. Teletext signal processor 8 generates interrupt signals with respect to second u-processor 12 when signals from first u-processor 3 are transferred through a data bus thereto.

However, such a conventional TV set with the functions of teletext is limited so that it may selectively display teletext video signals or television broadcast signals on a CRT.

SUMMARY OF THE INVENTION

It is an object of the present invention to provide an apparatus and a method for allowing the user to store and edit desired messages so as to freely display on a TV screen.

It is an other object of the present invention to provide a remote control having the key functions of storing, fetching and editing memos, assisting the editing, such as completing displayed characters, erasing the characters, adjusting the position of the cursor, switching modes, and constructing English/German fonts, so that the simplified key operation may display the desired messages on the screen.

It is another object of the present invention to provide a method of storing the present X and Y coordinates to be displayed at each of an X CDP register and a YCDP register in a video signal generating means, respectively, and displaying one character font through the precedures in order of storing character font data values at memory addresses pointed by each of the X CDP AND Y CDP registers, changing them into color signals and then providing them to a CRT.

In accordance with the present invention, a TV system with functions of Teletext comprises a tuning portion provided with a tuner for receiving broadcast signals through an antenna and a controller thereof, a first u-processor for controlling various functions of the TV system, a luminance and chrominance signal processor for processing the broadcast signal received by the tuning portion, a R.G.B. signal switching circuit for selectively providing video signals, teletext data or memo data to a CRT, a data sync separating and slicing means for separating synchronizing signals from the composite video signals of the tuning portion to convert teletext data carried in the vertical blanking intervals thereof into digital data, a video signal generating means with a function of automatically refreshing a memory means for storing video information commanded by a second u-processor into the memory means and converting video information produced from the memory means into analog signals so as to display them on the screen of the CRT according to internally generated horizontal and vertical synchronizing signals, a signal generating portion for combining on screen display signals (OSD signals of the first u-processor with the chrominance signals of the video signal generating means and applying the combined signals to a R.G.B signal switching circuit, a processor for storing and editing a program according to commands issued by the second u-processor, after the second u-processor detects key interrupt signals, a teletext signal processor for receiving composite video synchronizing signals and teletext digital data of the data sync separating and slicing means, storing the data into the memory means under the control of the second u-processor, and receiving key signals of a remote control from the first u-processor to carry out the program for transferring key signals to the second u-processor, and a teletext program memory means for permitting the second u-processor to directly access thereto, storing temporary information and parameters and having a teletext control program.

Also, a memory back-up means for storing data related to the performance of the program for editing and storing the data comprises a memory for storing data for screen displaying, EEPROM for storing data and parameters associated with the performance of the program, and RAM for buffering data.

According to another aspect of the present invention, a remote control initiates key functions of storing, fetching and editing memos so as to display data on a TV screen, assisting the editing, such as completing displayed characters, erasing characters, cursor up, cursor down, cursor left, cursor right, and switching modes, such as German/English modes, constructing English/German fonts, and operating character keys by using edit assisting keys.

According a further aspect of the present invention, a method of storing and editing data in a TV system with the functions of teletext comprises a first step of determining whether a key interrupt signal indicates a TV mode, a teletext mode or a data edit mode, so that if it indicates the TV mode or the teletext mode, the associated function is performed according to a given process, a second step of performing the corresponding program stored at the memory if the first step indicates the data edit and storing mode, a third step for discriminating among the functions for storing, fetching and editing memo data at the second step and performing the corresponding program for each of the functions, a fourth step of determining the storing of memo data, the indicating of a cursor and the switching of a character mode if the third step indicates the first switching of the TV mode or the teletext mode into the memo mode and performing the program for each of the functions, the fifth step of switching the TV set into TV mode by detecting a memo fetching key, if the memo data edited and stored by the user in the third step is indicated on the TV screen, and a sixth step of storing memo recognition and memo data into the memory if the third step indicates memo storing mode.

According to still another aspect of the present invention, a method of displaying one character font comprises a first step of processing the corresponding program for establishing the X and Y coordinates so as to determine the position of the present character to be diplayed, a second step of storing the character font data instructed by the address of a character font to be displayed at the first step into a register A so as to increase the character font, a third step of determining the carry value appearing when shifting the content of the register A at the second step, a fourth step of further detecting the carry value appearing when shifting the content of the register A at the third step, a fifth step of storing the value of a register B into each of an XCDP register and a YCDP register and DRAM register at the fourth step, a sixth step of converting data corresponding to the values of the displaying and background colors of the register B into analog chrominance signals of R.G.Bs at the fifth step, a seventh step of discriminating the X counted value at the sixth step so as to perform the associated process, an eighth step of determining the Y counted value at the seventh step so as to perform the associated process, a ninth step of performing the associated process if the Y counted value is not the desired result at the eighth step, and a tenth step of performing the associated process if the Y counted value is the desired result at the eighth step.

Preferred embodiments of the present invention will now be described more specifically with reference to the attached drawings which constitute a part of the present application.

BRIEF DESCRIPTION OF THE ATTACHED DRAWINGS

FIG. 10 is a schematic diagram for illustrating the specifying of the address storing English, German and special characters according to the present invention.

DETAILED DESCRIPTION OF A CERTAIN PREFERRED EMBODIMENT

Figure 1:
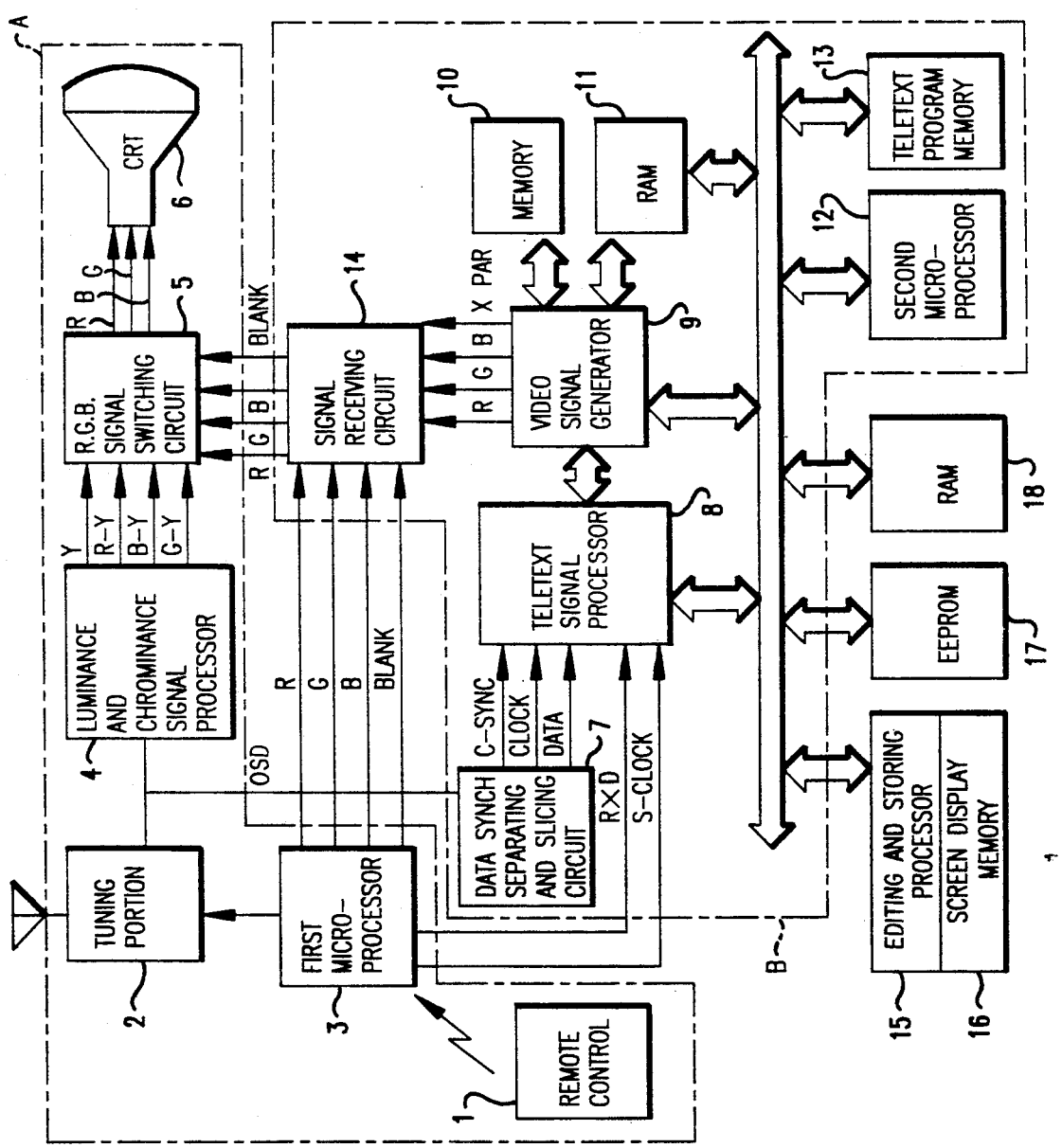
FIG. 1 is a block diagram of the circuit of a TV system according to an embodiment of the present invention.

Referring to FIG. 1, a TV system with the functions of Teletext according to the present invention comprises TV set A and teletext receiving process section B for processing teletext signals. TV set A comprises tuning portion 2 provided with a tuner for receiving broadcast signals through an antenna and a controller, first u-processor 3 for controlling various functions of TV set A, luminance and chrominance signal processor 4 for processing the broadcast signal received by tuning portion 2, and R.G.B. signal switching circuit 5 for selectively providing video signals, teletext data or memo data to cathode ray tube (CRT) 6. Teletext receiving process section B for processing teletext signals comprises data sync separating and slicing means 7, video signal generating means 9, signal receiving process portion 14, processor 15 for editing and storing data, teletext signal processor 8, and teletext program memory means 13.

Data sync separating and slicing means 7 separates synchronizing signals from composite video signals of tuning portion 2 to convert teletext data carried in the vertical blanking interval into digital data.

Video signal generating means 9 automatically refreshes memory 10, and stores video information commanded by second u-processor 12 into memory 10, converts video information produced from memory 10 into analog signals for display on the screen of CRT 6 according to internally generated horizontal and vertical synchronizing signals.

Signal generating portion 14 combines on screen display signals (OSD signals) of first u-processor 3 with chrominance signals of video signal generating means 9. These combined signals are applied to R.G.B. signal switching circuit 5.

Processor 15 stores and edits programs according to commands issued by second u-processor 12 after second u-processor detects key interrupt signals.

Teletext signal processor 8 receives composite video synchronizing signals and teletext digital data of data sync separating and slicing means 7, stores data into memory 10 under the control of second u-processor 12, and further receives key signals of remote control 1 from first u-processor 3 to carry out the program for transferring key signals to second u-processor 12. Data is stored at random access memory (RAM) 11.

Teletext program memory means 13 stores temporary information and parameters, and teletext control programs. Teletext program memory means 13 is directly accessable by second u-processor 12.

A memory back-up means for storing data related to the performing of the program for editing and storing data comprises memory 16 for storing data for screen displaying, EEPROM 17 for storing data and parameters associated with the performance of a program, and RAM 18 for buffering data.

Figure 2:
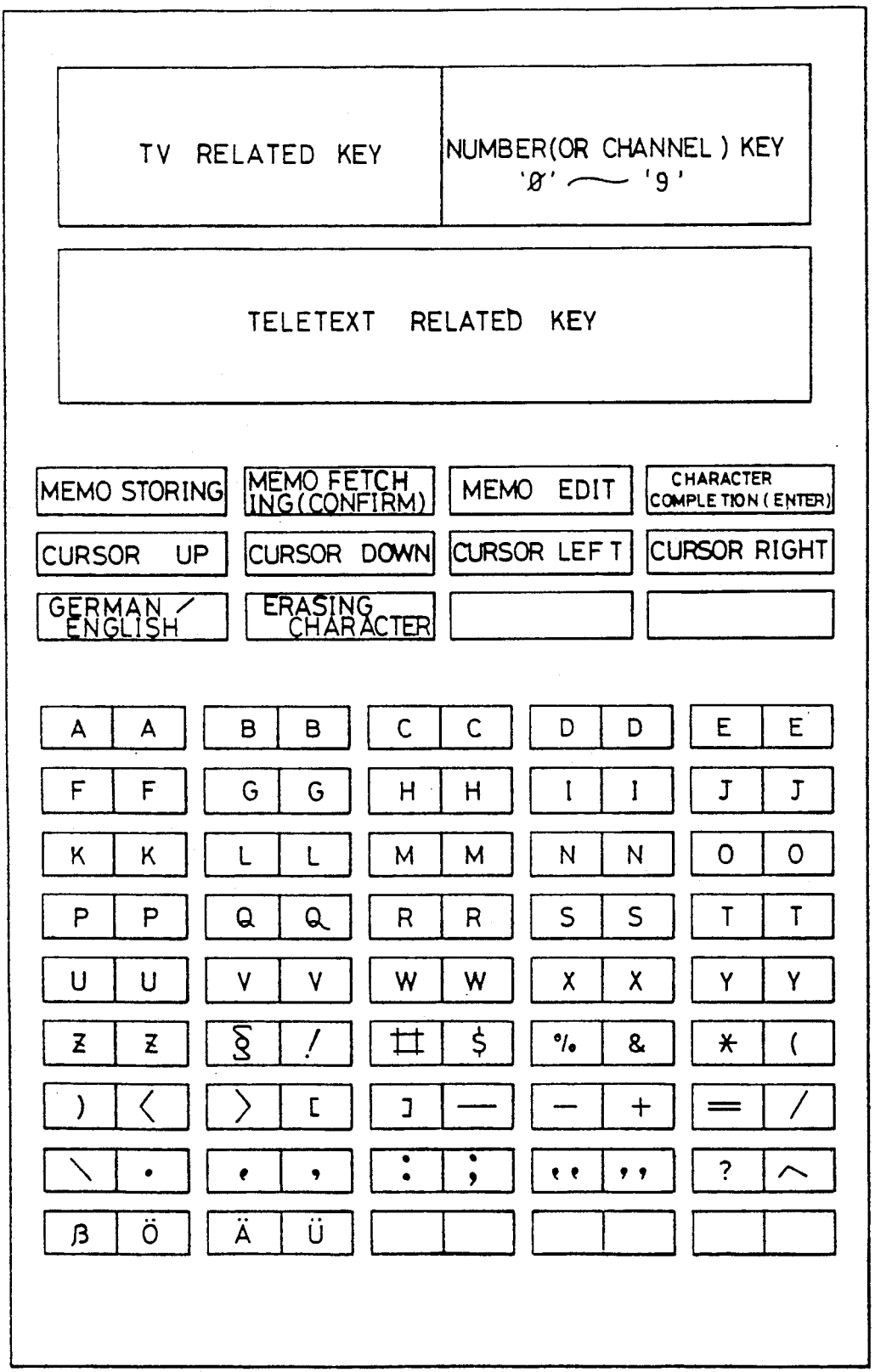
FIG. 2 is a schematic view of the appearance of a remote control according to the present invention.

Referring to FIG. 2, remote control 1 is constructed so as to have key functions of storing, fetching and editing memos so as to display data on a TV screen, assisting the editing, such as the completing of the displayed characters, erasing of characters, positioning up, the cursor down, cursor left, or right, and switching modes, such as German/English modes, constructing English/German fonts, and operating character keys by using edit assisting keys.

Character keys for constructing English/German fonts are arranged with English and German alphabets positioned respectively on left and right sides. On left and right sides of the next key are symbols (§-∧) and German special characters (β-ü). Keys equally divided into the left side and the right side are commonly used.

The operation of the inventive circuit will now be described with reference to FIGS. 1 to 10.

TV set A is a conventional one, and therefore will not be further described.

Data sync separating and slicing means 7 in teletext receiving process section B separates synchronizing signals from composite video signals outputted from tuning portion 2, and converts teletext data carried in the vertical blanking interval (VBI) of synchronizing signals into digital signals. Teletext signal processor 8 receives composite video synchronizing signals and teletext digital data of data sync separating and slicing means 7, stores data in a First-in and First-out (FIFO) mode into memory 10 under the control of second u-processor 12, and receives key signals RXD and S.CLOCK of remote control 1 from first u-processor 3 to carry out the program for transferring key signals to second u-processor 12. Data is stored at program RAM 11 accessable by second u-processor 12.

Video signal generating means 9 has a function of automatically refreshing memory 10, which stores video information commanded by second u-processor 12, and converting video information produced from memory 10 into analog signals transfer to signal generating portion 14 for display on the screen of CRT 6 according to internally generated horizontal and vertical synchronizing signals. Memory 10 stores one page of information to be displayed on the present TV screen.

Program RAM 11 stores temporary information and parameters directly accessed by second u-processor 12. Teletext program memory 13 for teletext signals stores the program for controlling teletext signals. Signal generating portion 14 combines the on screen display signals (OSD signals) of first u-processor 3 and chrominance signals of video signal generating means 9 so as to apply the combined signals to R.G.B. signals switching circuit 5.

Signals from the remote control 1 are transferred to first u-processor 3 that interprets and applies them through communication lines RXD and S.CLOCK to teletext signal processor 8. Teletext signal processor 8 generates interrupt signals transferred through a data bus to second u-processor 12. If second u-processor 12 detects interrupt signals, second u-processor 12 for editing and storing data performs the program of processing a key interrupt of processor 15.

In that case, data related to the performance of editing and storing data is stored at a memory back-up means, which comprises memory 16 for storing data for screen displaying, EEPROM 17 for storing data and parameters associated with the performance of the program, and RAM 18 for buffering data.

Figure 3:
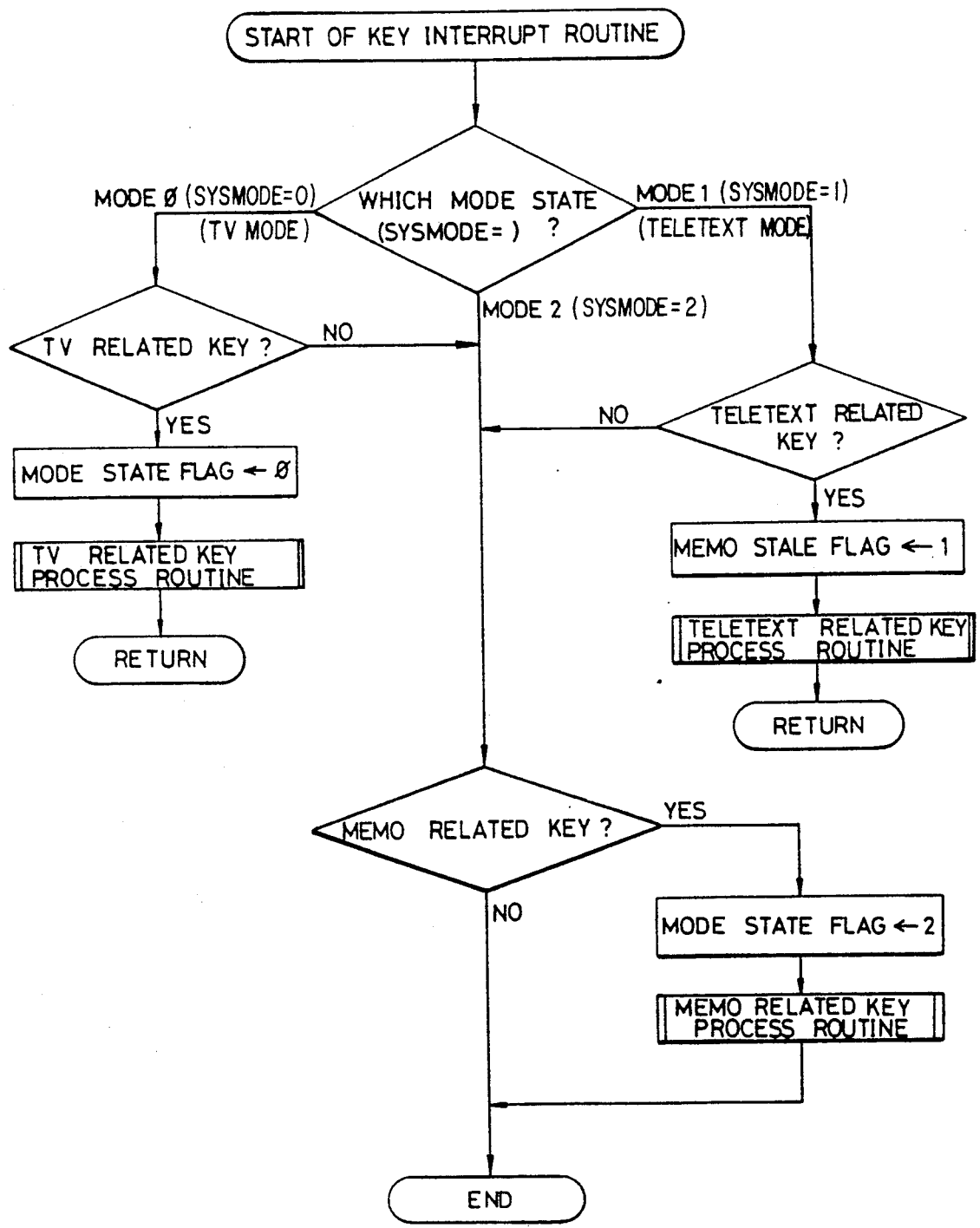
FIG. 3 is a flow chart for illustrating the routine for processing a key interrupt according to the present invention.

According to the inventive routine of editing and storing data in such a TV system, the method of processing key interrupts comprises, as shown in FIG. 3, the steps of determining whether a key interrupt indicates a TV mode, a teletext mode or a data edit mode, so that if it indicates the TV mode or the teletext mode, the associated function is performed according to a given process, and the corresponding program stored at memory 10 is performed if the previous step indicates the data edit and storing mode.

It is determined whether a key interrupt indicates a TV mode, a teletext mode or a data edit mode, so that if it indicates the TV mode or the teletext mode, the associated function is performed according to a given process. Namely if a key interrupt indicates the functions of the TV set, the functions of the TV set are performed, while if it indicates the functions of teletext, the functions of teletext are performed.

The method of performing the TV function, if a key interrupt indicates the TV mode (SYSMODE=$\phi$), further includes the steps of setting the flag of the mode state to "$\phi$" performing TV related key process routine, and returning to the key interrupt waiting state.

The method of performing the teletext, when a key interrupt indicates the teletext mode (SYSMODE=1), further includes the steps of discriminating whether a key interrupt represents the teletext related key or the memo related key, setting the flag of the mode state to "1" to perform the teletext related process routine, and returning to the key interrupt waiting state.

If a key interrupt indicates the editing and storing of data (SYSMODE=2), the flag of the mode state is set to "2" to perform the memo related process routine, and a return is made to the key interrupt state.

Figure 4A:
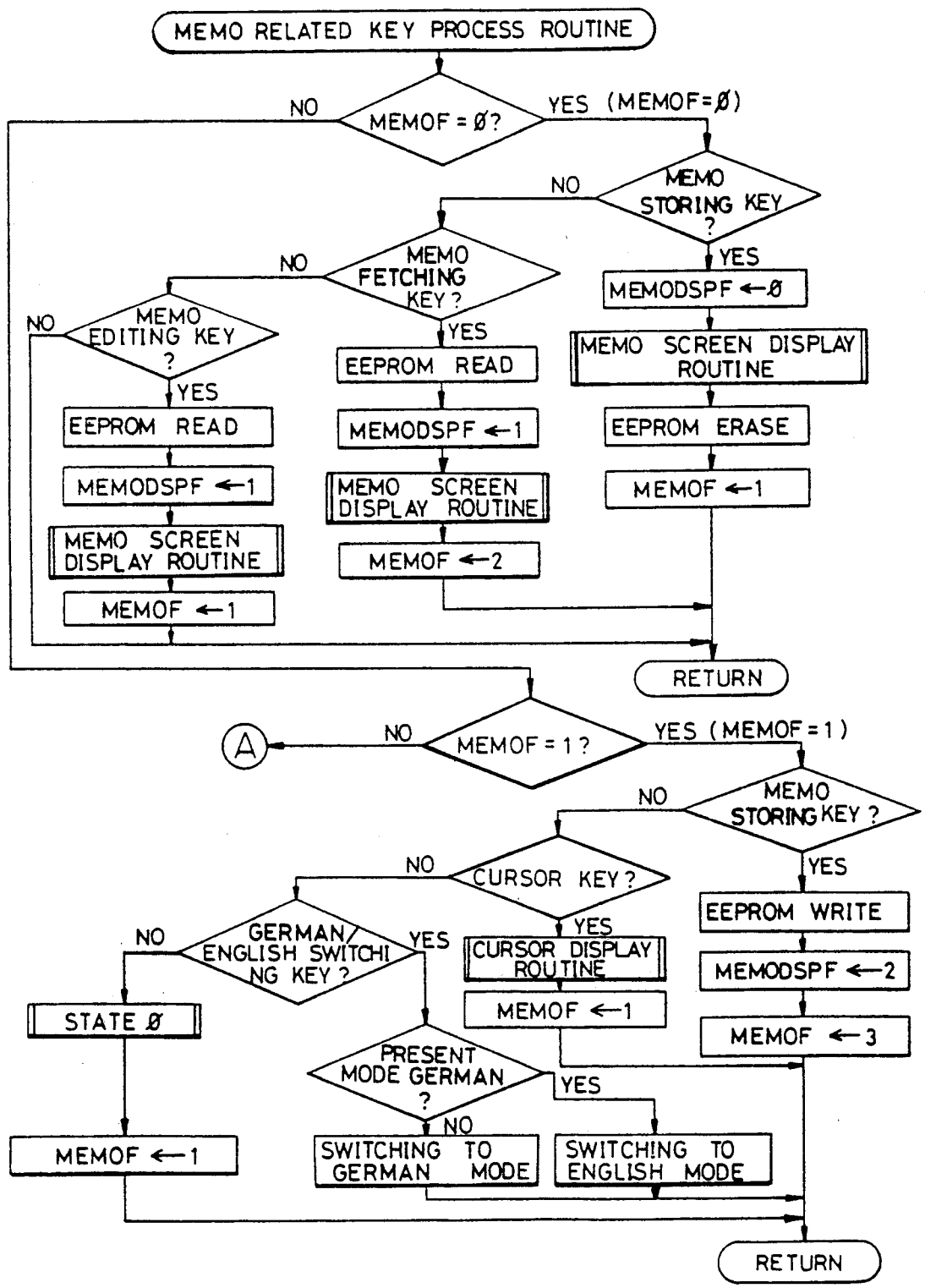
FIGS. 4A and 4B are a flow chart for illustrating the routine for processing a memo related key signal according to the present invention.
Figure 4B:
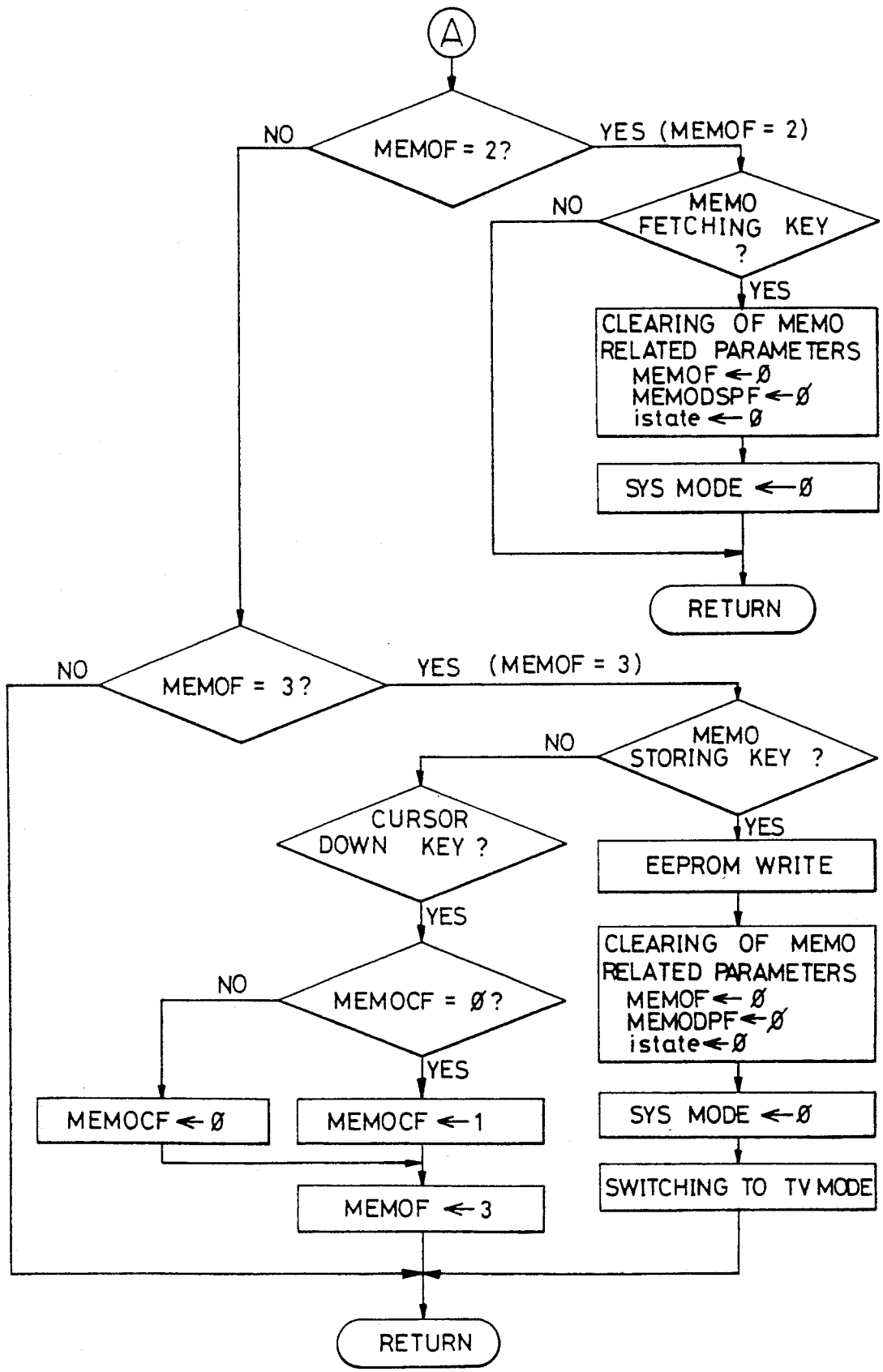

The memo related key process routine according to the inventive method of editing and storing data, as shown in FIGS. 4A and 4B, comprises the steps of determining whether a key interrupt indicates the storing, the fetching and the editing for the memo data so as to perform the program of each of the functions, determining the matter for storing of the memo data, the displaying of the cursor and the switching of the character mode, so that if the previous first step indicates the first switching of the TV or the teletext mode into the memo mode it performs the program of each of functions, detecting the memo fetching key signal to switch the function into the TV mode if the memo data edited and stored by the user is displayed on the TV screen, and identifying the memo and storing the memo data if the previous step indicates the memo storing mode.

The method of performing the program of each of functions associated with determining the storing, the fetching and the editing of memo data comprises the steps of storing the memo according to the associated process if it indicates the storing of the memo data, performing the memo fetching function according to the associated process if a key interrupt indicates the fetching of the memo data, and performing the memo editing function according to the associated process if a key interrupt indicates the editing of the memo data.

The method of performing the program for storing the memo data, indicating cursor and switching character mode, if the above step indicates the first switching of the TV mode or the teletext mode into the memo mode, comprises the steps of storing the memo according to the corresponding process if an interrupt indicates the storing of the memo, displaying the cursor according to the corresponding process if a key interrupt indicates the cursor key, and switching the character mode according to the corresponding process.

The method of switching the memo mode into the TV mode on the basis of discriminating the memo fetching key signal, if the memo data edited and stored by the user is displayed on the TV screen, comprises switching the memo mode into the TV mode according to the corresponding process if a key interrupt indicates the fetching of the memo data, or otherwise identifying the memo according to the corresponding process.

The method of identifying and storing the memo data into the memory, if the above step indicates the memo storing mode, comprises the steps of switching the TV set into the TV mode if a key interrupt indicates the storing of the memo data, or otherwise determining according to the corresponding process whether a key interrupt indicates positioning the cursor down.

If a key interrupt indicates the first switching of the TV mode or the teletext mode into the memo mode (other memo related key signals being neglected except the signals of storing, editing and retrieving the memo data at the state of MEMOF=$\phi$), the method of processing the memo related key signals comprises the steps of clearing the flag of the memo display (MEMODSPF-0) if the pesent inputted key interrupt indicates the storing of the memo to perform the memo displaying routine, erasing all the data previously stored at memory 17, storing the present memo mode state "1" at the memory, and returning to the key interrupt waiting state.

If the present key signal indicates the fetching of the memo mode, the memo data backed up at memory 17 is read, and stored at program RAM 11. In order to display the data on the TV screen, "1" is stored at the memo display flag, and the memo displaying routine is performed. Then "2" is stored at the present mode state flag (MEMOF), and the process returns to the key interrupt waiting state. If a key interrupt indicates the memo editing key signal, memo data backed up at memory 17 is read, and "1" is stored at memo display flag (MEMOFDSPF). Then the memo display routine is performed, and a return is made to the key inturrupt waiting state.

If the present interrupt does not indicate the memo editing key signal, it is ignored and the process is returned to the key interrupt waiting state.

With the state of editing the memo data stored at the program RAM 11 (MEMOF=1), if a key interrupt indicates the memo storing signal, the memo data stored at the program RAM 11 is backed up at memory 17, "2" is stored at the memo display flag, "3" is stored at the present memo mode state flag, and the process returns to the key interupt waiting state.

Figure 5:
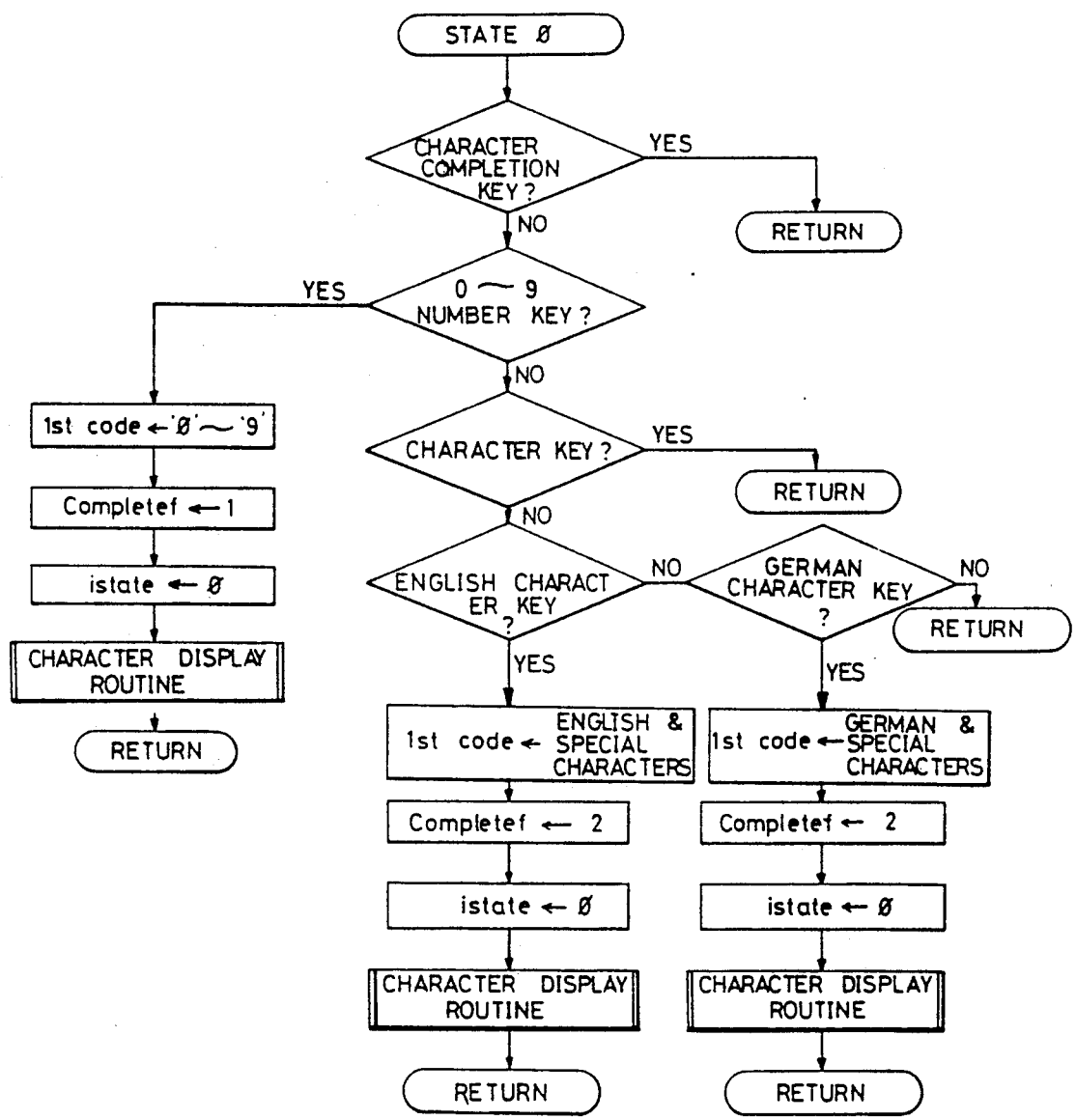
FIG. 5 is a flow chart for illustrating the routine for inputting and displaying character data according to the present invention.

If the present interrupt indicates the switching of German/English modes instead of the cursor key, the present German or English mode is changed to the opposite. The German/English switching keys are made to toggle to each other. If a key interrupt does not indicate the switching of German/English modes, the routine of the character data input and display (STATE $\phi$) as shown in FIG. 5 is performed. The memo mode state is set to 1 (MEMOF=1) and a return is made to the key interrupt waiting state.

With the state of the present memo mode being the memo fetching mode (MEMOF=2) (i.e., the memo data edited and stored by the user being displayed on the present TV screen by the input of the previous memo fetching signal), if a key interrupt indicates memo fetching, the memo related parameters are cleared (MEMOF-$\phi$, MEMODSPF-$\phi$, istate-$\phi$), and then the process is returned to the switching of the memo mode into the TV mode (SYSMODE-$\phi$), or otherwise returned to the key interrupt waiting state without regarding the memo related key signal.

With the state of the present memo mode being the memo storing mode (MEMOF=3) (i.e., in order to establish a plurality of modes for displaying memo data at power on, a channel up/down, a memo fetching key input, etc. when the memo data edited and stored by the user is to be fetched), if the present interrupt indicates the "memo storing" key, the memo data stored at the program RAM 11 is backed up at EEPROM 17, and the memo related parameters are cleared (MEMOF-$\phi$, MEMODSPF-$\phi$, istate-$\phi$). Then, the memo mode is switched into the TV mode and the process returns to the key interrupt waiting state. Otherwise, if a key interrupt indicates the "cursor down" key and the memo identification, the flag of the memo identification mode is set to 1 (MEMOCF-1). If not, the flag of the memo identification confirmation mode is set to $\phi$ (MEMOCF-$\phi$), "3" is stored at the memo mode state flag and then this process is returned to the key interrupt waiting state.

The character data input and display process method (STATE $\phi$), as shown in FIG. 5, comprises the steps of determining whether a key input signal indicates character completion or numbers, so as to perform the associated functions according to a given process if it does not indicate the character completion or numbers, and perform the associated functions according to a given process if a key interrupt indicates the character key signal, such as English/German character.

The method of performing the associated functions according to a given process, if a key interrupt indicates the characters or English/German characters, comprises the steps of displaying the English characters according to the associated process if a key interrupt indicates the character key and English key signals, and displaying the German characters according to the associated process if a key interrupt at the previous step indicates the character key and German key signals.

In the character data input and display process routine, if a key interrupt indicates the "character completion" key, the process is returned to the state 0, or otherwise it is determined whether a key interrupt indicates the "number" key.

The inputted number key signal is stored at a first code parameter (1st code), "1" into the character completion parameter (Completef) and "φ" into the key input state parameter (Istate) if the present inputted key signal indicates the "number" key (φ−9), then the character displaying routine is performed and returned to the state 0.

If the present inputted signal does not indicate the "number" key (φ-9) and the character key, the process is returned to the state 0. Otherwise if a key interrupt indicates the "English" character key (A-Z), the inputted English character and special character are stored at the first code parameter (1st code), "2" at the character completion parameter (Completef) in order to display the English character and special characters on the TV screen and "φ" at the key input state parameter (Istate) in order to process the next key signals in the key input state φ routine, then the character displaying routine is performed and returned to the state 0.

The character display routine is directly returned to the state 0, if a key signal does not indicate the German or English character key. On the contrary, if the inputted signal indicates the German character key, the inputted German character and special character are stored at the first code parameter (1st code), "2" at the character completion parameter (Completef) in order to display the German character and special character on the TV screen and "φ" at the key input state parameter (Istate) in order to process the next key signals in the key input state φ routine, then the character displaying routine is performed and returned to the state 0.

Figure 6A:
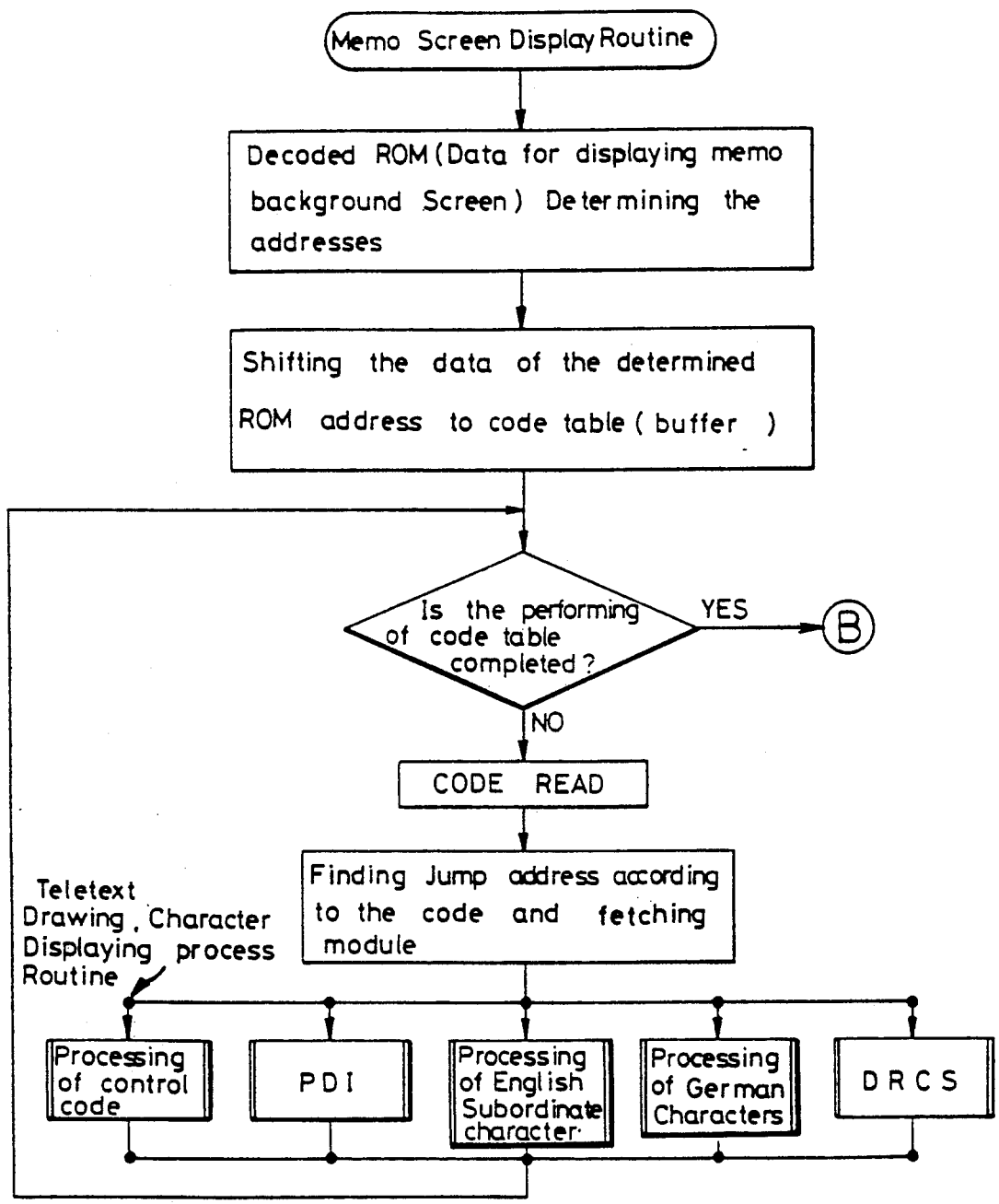
FIGS. 6A and 6B are a flow chart for illustrating the routine for displaying a memo screen according to the present invention.
Figure 6B:
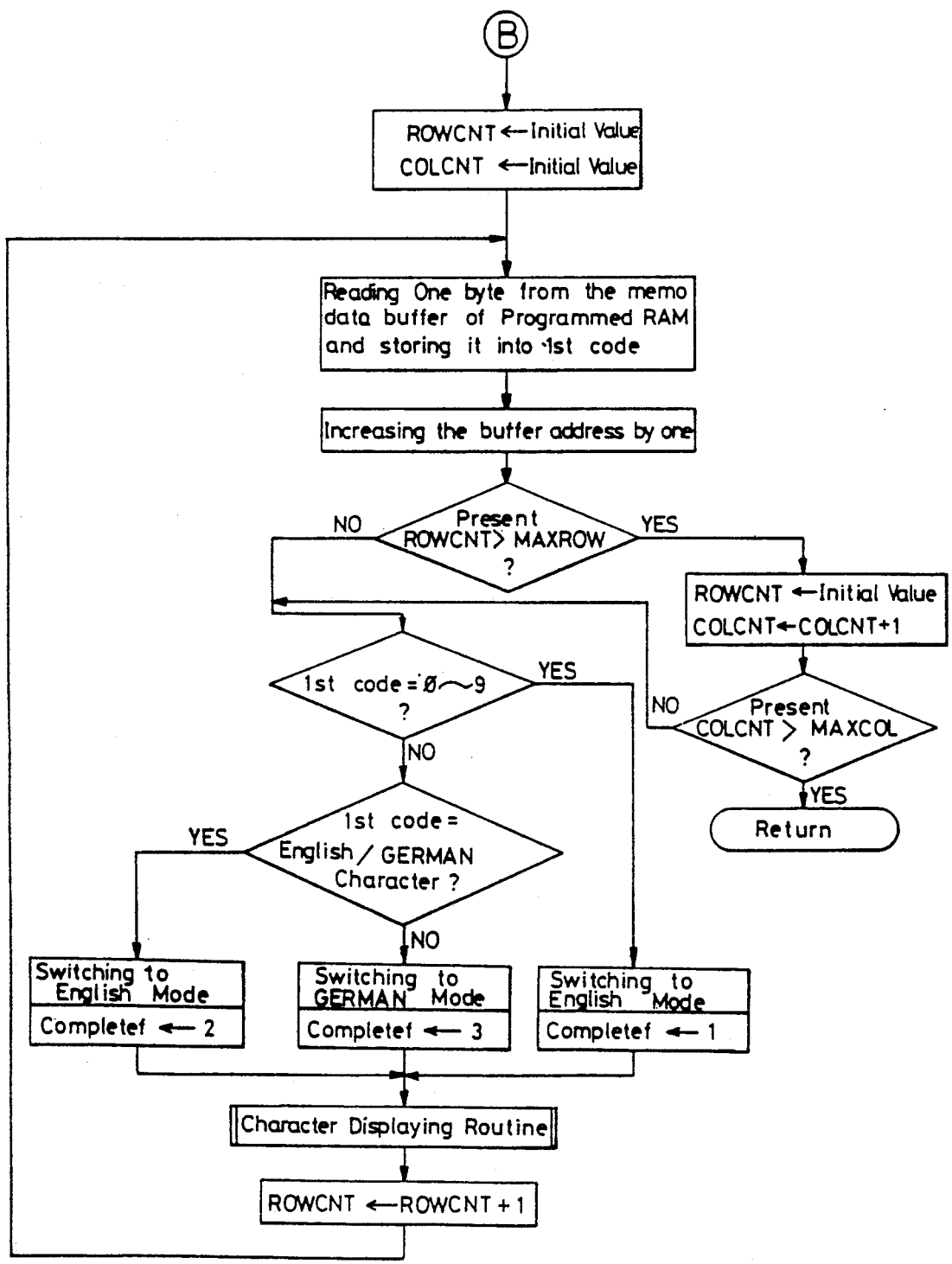

The memo screen display routine, as shown in FIGS. 6A and 6B, comprises the steps of performing the corresponding module fetching and the related functions according to a given program, and performing the function related to display the characters on the screen according to a given process.

The method of performing the functions associated with the displaying of the characters on the screen includes the steps of comparing the row and column counted values indicating the character displaying position on the screen so as to perform the related functions according to the associated process, and determining the English or German character mode so as to perform the related functions according to the associated process.

The memo screen display routine further includes the steps of determining the address in a programmed ROM for storing ROM data for displaying the memo background screen on the TV screen, storing the ROM data stored at the determined addresses of the programmed ROM into a data buffering RAM used as a code table (buffer), reading the data stored at the code table (buffer) one byte by one byte in order to conform to the common teletext coding method (NAPLPS: North American Presentation Level Protocol Syntax) during the performance of the code table, finding the jump addresses, fetching the module, fetching the existing teletext figure and character displaying routine, such as control code process, picture description instruction (PDI), English subordinate character process, German character process and dynamic redefine character set (DRCS), performing the existing teletext figure and character displaying routine so as to process the memo background screen data stored at the code table, storing the processed data at video RAM 10, and reading out data stored at memory 10 through video signal generating means 9. Data stored at memory 10 is converted into R.G.B. color signals.

After performing the code table, the initial values of the row counter (ROWCNT) and column counter (COLCNT) are established so as to display the user's memo data as the memo background on the TV screen. One byte of the memo data buffer 18 of program RAM 11 storing storing the user's memo storing data is stored at the first code parameter (1st code). After increasing the address of the memo data buffer by +1, the initial value of the row counter (ROWCNT) is established if the present row counted value is greater than the maximum row counted value (MAXROW). The character displaying on the TV screen is regarded as completed if the column counted value (COLCNT) increased by one is greater than the maximum column counted value (MAXCOL), and the process routine is returned to the memo display.

The character displaying on the TV screen is regarded as not completed if the existing row counted value (ROWCNT) is equal to or less than the maximum column counted value (MAXCOL) or the increased column counted value (COLCNT) is equal to or less than the maximum column counted value (MAXCOL). Then if the first code parameter (1st code) is the "number" code (φ-9), the present character displaying mode is switched into the English mode, "1" is stored at the character completion parameter (Completef), and the character display routine is performed so as to display the "number" code, one byte from the memo data buffer of program RAM 11 is read in order to store at the first code parameter (1st code) by increasing the row counted value (ROWCNT) by one and to return to the memo display.

If the first code parameter (1st code) is the English character instead of the "number" code, the mode is switched into the English mode, and "2" is stored at the character completion parameter (complete). Then the character display routine is performed in order to display the "English character" code. Then, by increasing (ROWCNT) by one, one byte of data from the memo data buffer of program RAM 11 is read out and stored at the first code parameter (1st code).

If the first code parameter (1st code) is the German character instead of the English character, the mode is switched into the German mode, and "3" is stored at the character completion parameter (complete). Then, the character display routine is performed in order to display the German character code. By increasing the row counted value (ROWCNT) by one, byte of data from the memo data buffer of program RAM 11 is read out and stored at the first code parameter (1st code).

Figure 7:
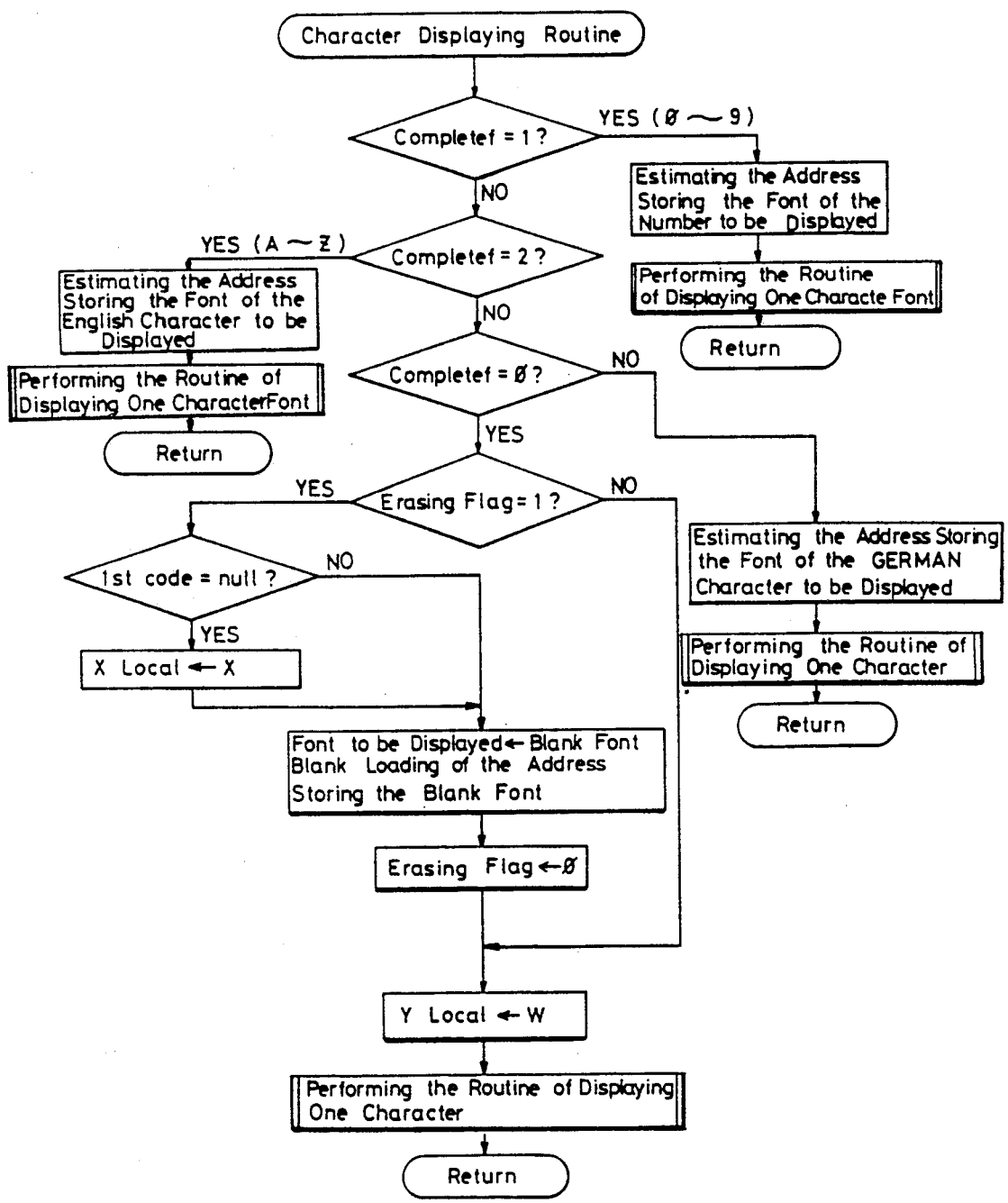
FIG. 7 is a flow chart for illustrating the routine of displaying characters according to the present invention.

As shown in FIG. 7, the character displaying routine further comprises the steps of performing the functions related to the displaying of the numbers on the TV screen according to a given process, performing the functions related to the displaying of the English characters on the TV screen according to a given process, performing the functions related to the displaying of the German characters on the TV screen according to a given process, and performing the functions related to erasing the characters displayed on the TV screen according to a given process.

If the present character completion parameter (Complete) is "1" (i.e., if the 'number' code is displayed on the TV screen), the addresses in memory 16 storing the font of the number code to be displayed are loaded at its font memory, and one character font displaying routine is performed. If the character completion parameter (Complete) is "2" (i.e., if the English code is displayed on the TV screen), the address in memory 16 storing the font of the English code to be displayed is loaded at its for memory, and one character font displaying routine is performed in order to display the English character on the TV screen and to then return to the character display.

The method of performing the functions related to the displaying of the German character on the TV screen according to a screen process, further includes the steps of loading the address of programmed ROM storing the font of the displayed German character if the present character completion parameter (Complete) is not "$\phi$", performing the displaying routine of one character font, and returning to the character display.

It is discriminated whether the erasing flag is "1", when the character completion parameter is "$\phi$"., obtaining X coordinate (X local) if the erasing flag is "1" and the first code parameter (1st code) is "null", loading the address of the displayed font storing blank font, obtaining, Y coordinate (Y local) after setting the erasing flag to "$\phi$", performing the displaying routine of one character font, and returning to the displaying routine, directly loading the address of the displayed font storing the blank font if the first code parameter (1st code) is not null, obtaining Y coordinate (Y local) if the erasing flag is not "1", performing the displaying routine of one character font, and returning to the character display.

Figure 8:
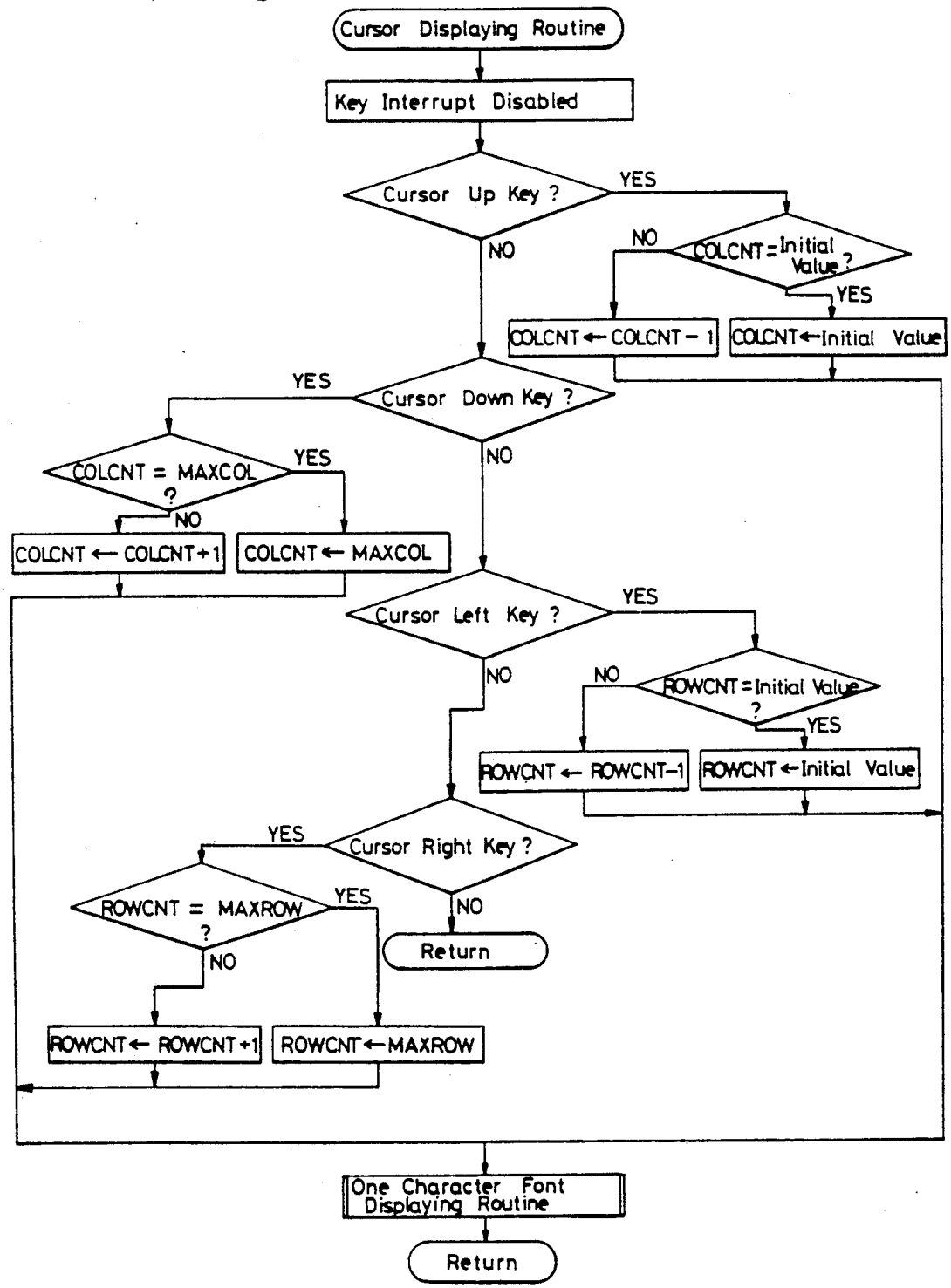
FIG. 8 is a flow chart for illustrating the routine of displaying the cursor according to the present invention.

The cursor displaying routine, as shown in FIG. 8, comprises the steps of processing the cursor up key, the cursor down key, the cursor left key, and the cursor right key during disabling of the key interrupt.

The method of processing the cursor up key during disabling of the key interrupt further includes the steps of performing the displaying routine of one character font (i.e., the first line displaying characters) if the present column counted value (COLCNT) is equal to the initially set value, and returning to the cursor display, or decreasing the present column counted value (COLCNT) by "1" if it is not equal to the initial value, then performing the displaying routine of one character font, and returning to the cursor display.

If the presently inputted key is the cursor down key, the displaying routine of one character font is performed if the column counted value (COLCNT) is equal to the maximum column counted value, or increasing the present column counted value (COLCNT) by "1" if it is not equal to the maximum column counted value, then performing the displaying routine of one character font, and returning to the cursor display.

In the state of the presently inputted key is the cursor left key, the displaying routine of one character font is performed (i.e., the position of the first character in an arbitrary line) if the row counted value (ROWCNT) is equal to the initially set value, 1, or the present row counted value (ROWCNT) is decreased by "1" if it is not equal to the initially set value, then performing the displaying routine of one character font, and returning to the cursor display.

If the presently inputted key is the cursor right key, the displaying routine of one character font is performed (i.e., the position of the last character in an arbitrary line) if the row counted value (ROWCNT) is equal to the maximum row counted value, or the present row counted value (ROWCNT) is increased by "1" if it is not equal to the maximum row counted value, then performing the displaying routine of one character font, and returning to the cursor display.

Figure 9A:
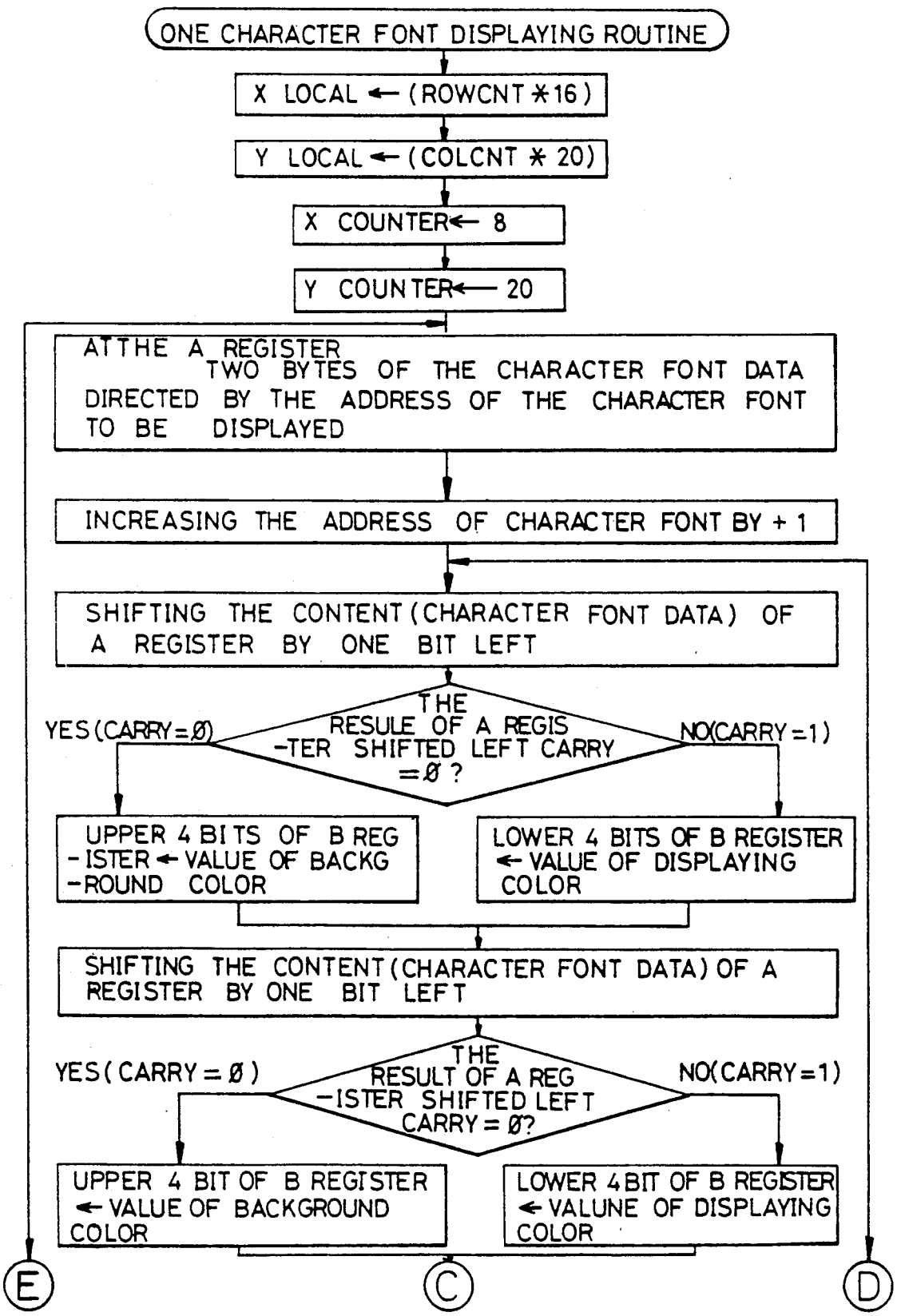
FIGS. 9A and 9B are a flow chart for illustrating the routine of displaying one character font according to the present invention.
Figure 9B:
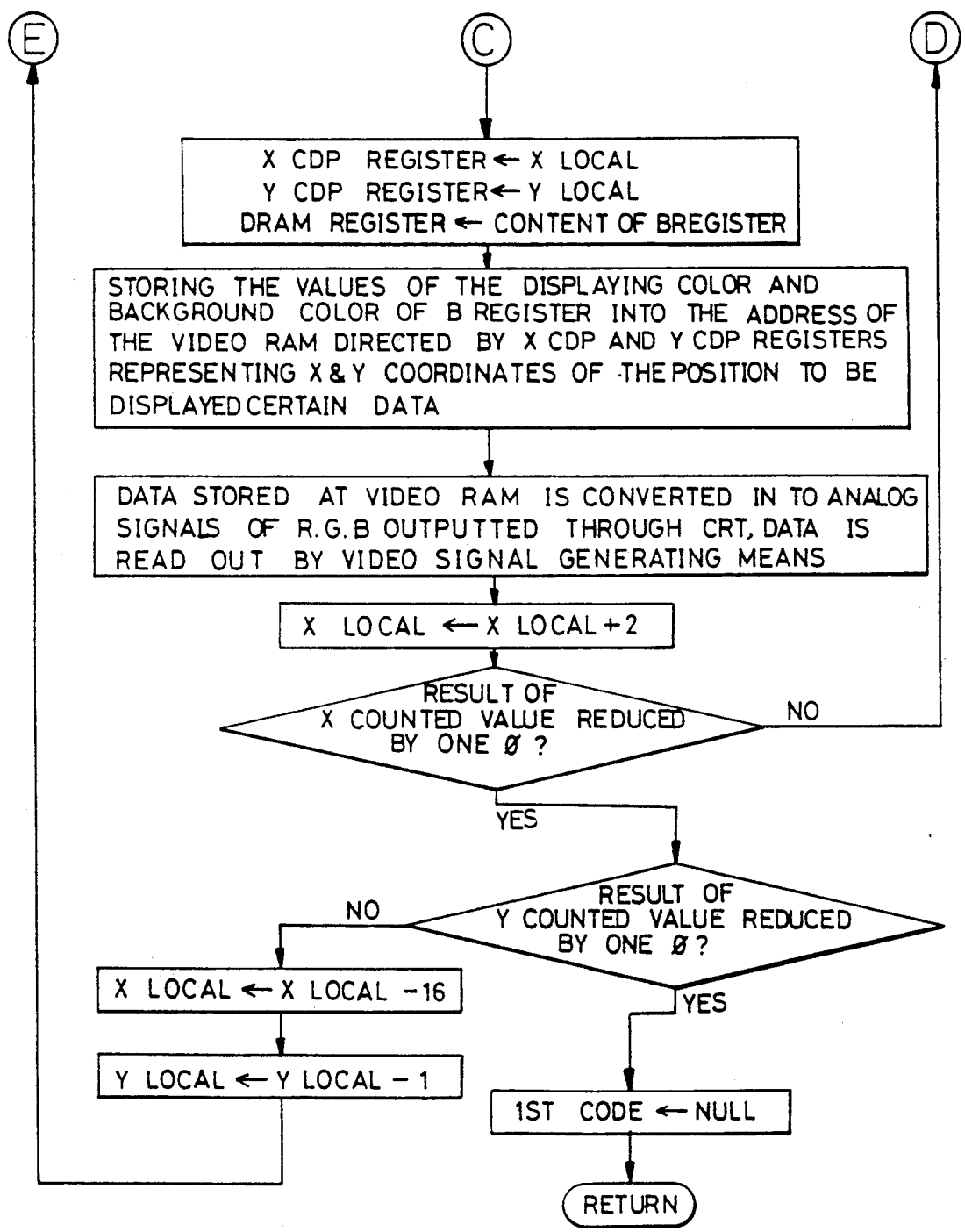

The method for displaying one character font on CRT 6 in order to edit and store data according to the present invention, as shown in FIGS. 9A and 9B, comprises the steps of establishing the X and Y coordinates so as to determine the position to display the present character, storing the character font data instructed by the address of the character font displayed in the first step into a register A so as to increase the character font, detecting the carry value appearing when shifting the content of the register A in the second step, again detecting the carry value appearing when shifting the content of the register A in the third step, storing the values of a register B at each of X CDP register, Y CDP register, and DRAM register at the fourth step, converting data corresponding to the values of the displaying color and background colors of the register B into analog chrominance signals of R.G.B. at the fifth step, detecting the X counted value from the sixth step so as to perform the associated process, detecting the Y counted value from the seventh step so as to perform the associated process, performing the associated process if the Y counted value is not desired result from the eighth step, and performing the associated process if the Y counted value is the desired result from the eighth step.

The method of establishing the X and Y coordinates so as to determine the position to display the present character further includes the steps of storing the present row counted value [(ROWCNT)*16] at the X coordinate (XLocal) and the present column counted value [(COLCNT)*20] at the Y coordinate (YLocal) in order to obtain the XLocal value and the YLocal value, respectively, representing the X and Y coordinates , and respectively storing 8 and 20 into each of the X counter and the Y counter in order to provide a loop counter. There are stored at the register A two bytes of the character font data pointed by the address of the displayed character font (row 16 Dot×column 20 Dot).

The content (two bytes of the character font data) of the register A is shifted left by one bit. The background color value is stored at the upper 4 bits of the register B if the carry value of the one bit shifted result is $\phi$. The displaying color value is stored at the lower 4 bits of the register B if the carry value is 1.

The content (two bytes of the character font data) of the register A is again shifted left by one bit. The background color is stored at the upper 4 bits of the register B if the one bit left shifted result indicates the carry value of $\phi$. The displaying color is stored at the lower 4 bits of the register B if the carry value is 1.

The values of the displaying and background colors are stored at the addresses of video RAM 10 specified by the registers XCDP and YCDP. Data stored at video RAM 10 is converted into analog signals of R.G.B. outputted through CRT 16. Data is read out by video signal generating means 9. The X coordinate is increased by two bits because of the displaying for 2 dots being completed in the X-coordinate.

The values of the XLocal and the YLocal are respectively reduced by 16 and 1 if the counted value reduced by one is not $\phi$. Two bytes of the character font data instructed by the addressing of the displayed character font (16 dots in a row, 20 dots in a column) are stored at the register A. If the present X counted value reduced by one is φ, the present Y counted value reduced by one is detected so as to complete the displaying of one character font having the size of column 20 Dot and row 16 Dot.

FIG. 10 illustrates an example of addresses for storing the fonts of English, German and special characters according to the present invention, wherein the addresses are indicated by hexadecimal codes.

As stated above, the present invention provides a TV system with the functions of teletext that allows the user to edit and store desired messages by using the number, and English and German characters.

What is claimed is:

1. A television receiving system having teletext function adaptable for storing, editing and displaying memo data provided thereto, comprising:
    tuner means for receiving broadcast signals, said broadcast signal including a television video signal and teletext data;
    means, coupled to said tuner means, for separating said teletext data from said broadcast signal;
    data input means, detachable from the rest of the television receiving system, for providing a plurality of key signals each representing selected at least one of operating modes including television, teletext and memo data modes, selected at least one of functions to be performed and memo data;
    first processor means, coupled to said data input means and said tuner means, for receiving said key signals and generating various control signals in response thereto;
    teletext processor means, coupled to said first processor means and said separating means, including means for generating a key interrupt signal associated with said selected operating mode and function, and means for generating a teletext video information signal in response to said teletext data and a memo data video information signals in response to said key signal representing the memo data;
    second processor means, coupled to said teletext processor means, for generating a command signal corresponding to said selected operating mode and function in response to said key interrupt signal;
    third processor means, coupled to said teletext processor means and said second processor means, for storing and editing said memo data video information signal in response to said command signal;
    first means, coupled to said teletext processor means and said third processor means, for selectively providing said teletext video information signal and said memo data video information signal in response to said command signal;
    second means, coupled to said first selectively providing means and said tuner means, for selectively providing said television video signal and selectively provided video information signal from said first selectively providing means; and
    means, coupled to said second selectively providing means, for displaying video images corresponding to selectively provided signal from said second selectively providing means.

2. The television receiving system of claim 1, further comprising means, coupled to said teletext processor means, for storing said teletext video information signal.

3. The television receiving system of claim 1, wherein said third processor means includes means for storing said memo video information signal.

4. The television receiving system of claim 1, wherein said first processor means includes means for generating on screen data in response to said key signals,
    further comprising means, coupled to said first processor means and said first selectively providing means, for combining said on screen data with said first selectively provided video information signal from said first selectively providing means,
    wherein said second selectively providing means selectively provides said television video signal and combined video information signal.

5. A method of storing and editing memo data in a television receiving system having teletext function, said receiving system being capable of performing various television, teletext and memo data functions and operable in television, teletext and memo data modes, said system having a television screen for displaying video images and a memory for storing various programs for enabling said various functions to be performed, comprising the steps of:
    providing key interrupt signals representing said operating modes and functions;
    determining a specified operating mode and function to be performed from said key interrupt signal;
    executing a program in said memory for storing, fetching and editing the memo data if the key interrupt signal indicates a memo data editing and storing function to be performed;
    executing a program in the memory for storing the memo data, displaying a cursor on the television screen and switching character mode, if the key interrupt signal indicates switching of the television or teletext mode of the receiving system to the memo data mode;
    detecting a memo fetching key to set the television receiving system to the television mode if the memo data stored and edited above is displayed on said television screen; and
    storing memo identification data and the memo data in said memory if said key interrupt signal indicates a memo data storing function to be performed.

6. A method of storing and editing memo data in a television receiving system having teletext function, said receiving system being capable of performing various television, teletext and memo data functions and operable in television, teletext and memo data modes, said system having a television screen for displaying video images and a memory for storing various programs for enabling said various functions to be performed, comprising the steps of:
    providing key interrupt signals representing said operating modes and functions;
    determining a specified operating mode and function to be performed from said key interrupt signal;
    executing a program in said memory for performing a specified television function if said key interrupt signal indicates such a function;
    executing a program in said memory for performing a specified teletext function if said key interrupt signal indicates such a function;
    executing a program in said memory for storing, fetching and editing the memo data if the key interrupt signal indicates a memo data editing and storing function to be performed;

executing a program in the memory for storing the memo data, displaying a cursor on the television screen and switching character mode, if the key interrupt signal indicates switching of the television or teletext mode of the receiving system to the memo mode;

detecting a memo fetching key to set the television receiving system to the television mode if the memo data stored and edited above is displayed on said television screen; and storing memo identification data and the memo data in the memory if said key interrupt signal indicates a memo data storing function to be performed.

7. A method of storing and editing memo data in a television receiving system having teletext function, said receiving system being capable of performing various television, teletext and memo data functions and operable in television, teletext and memo data modes, said system having a television screen for displaying video images and a memory for storing various programs for enabling said various functions to be performed, comprising the steps of:

providing key interrupt signals representing said operating modes and functions;

determining a specified operating mode and function to be performed from said key interrupt signal;

executing a program in said memory for storing the memo data if said key signal indicates a memo data storing, fetching or editing function to be performed;

executing a program in said memory for fetching the memo data if said key interrupt signal indicates the memo data fetching function to be performed;

executing a program in said memory for editing the memo data if said key interrupt signal indicates the memo data editing function to be performed;

executing a program in the memory for storing the memo data, displaying a cursor on the television screen and switching character mode, if the key interrupt signal indicates switching of the television or teletext mode of the receiving system to the memo mode;

detecting a memo fetching key to set the television receiving system to the television mode if the memo data stored and edited above is displayed on said television screen; and storing a memo identification and the memo data in the memory if said key interrupt signal indicates a memo data storing function to be performed.

8. A method of storing and editing memo data in a television receiving system having teletext function, said receiving system being capable of performing various television, teletext and memo data functions and operable in television, teletext and memo data modes, said system having a television screen for displaying video images and a memory for storing various programs for enabling said various functions to be performed, comprising the steps of:

providing key interrupt signals representing said operating modes and functions;

determining a specified operating mode and function to be performed from said key interrupt signal;

executing a program in said memory for storing the memo data if said key interrupt signal indicates a memo data storing function;

executing a program in said memory for displaying a cursor on the television screen if said key interrupt signal indicates a cursor indicating function;

executing a program in said memory for switching character mode if said key interrupt signal indicate a switching character mode function;

detecting a memo fetching key to set the television receiving system to the television mode if the memo data stored and edited above is displayed on said television screen; and storing memo identification data and the memo data in the memory if said key interrupt signal indicates a memo data storing function to be performed.

9. A method of storing and editing memo data in a television receiving system having teletext function, said receiving system being capable of performing various television, teletext and memo data functions and operable in television, teletext and memo data modes, said system having a television screen for displaying video images and a memory for storing various programs for enabling said various functions to be performed, comprising the steps of: program for switching character mode includes the substeps of:

providing key interrupt signals representing said operating modes and functions;

determining a specified operating mode and function to be performed from said key interrupt signal;

executing a program in said memory for storing, fetching and editing the memo data if the key interrupt signal indicates a memo data edit and storing function to be performed;

executing a program in the memory for storing the memo data, displaying a cursor on the television screen and switching character mode, if the key interrupt signal indicates switching of the television or teletext mode of the receiving system to the memo data mode;

setting the television receiving system to the television mode if said key interrupt signal indicates a memo data fetching function;

executing a program in said memory for memo identification, if say key interrupt signal indicates no memo data fetching function; and detecting a memo fetching key to set the television receiving system to the television mode if the memo data stored and edited above is displayed on said television screen; and storing memo identification data and the memo data in the memory if said key interrupt signal indicates a memo data storing function to be performed.

10. A method of storing and editing memo data in a television receiving system having teletext function, said receiving system being capable of performing various television, teletext and memo data functions and operable in television, teletext and memo data modes, said system having a television screen for displaying video images and a memory for storing various programs for enabling said various functions to be performed, comprising the steps of:

providing key interrupt signals representing said operating modes and functions;

determining a specified operating mode and function to be performed from said key interrupt signal;

executing a program in said memory for storing, fetching and editing the memo data if the key interrupt signal indicates a memo data edit and storing function to be performed;

executing a program in the memory for storing the memo data, displaying a cursor on the television screen and switching character mode, if the key interrupt signal indicates switching of the television or teletext mode of the receiving system to the memo data mode;

detecting a memo fetching key to set the television receiving system to the television mode if the memo data stored and edited above is displayed on said television screen; and setting the receiving system to the television mode if said key interrupt signal indicates a memo data storing function; and determining whether said key interrupt signal indicates a cursor down function if said key interrupt signal indicates no memo data storing function.

11. The method of claim 5, wherein the step of determining a specified operating mode and function includes the substeps of setting the receiving system to a "φ" mode state to perform various television functions; and setting the system to a key interrupt waiting state if said key interrupt signal indicates the television mode.

12. The method of claim 5, wherein the step of determining a specified operating mode and function includes the substeps of:

setting the receiving system to a "1" mode state to perform various teletext functions; and setting the system to a key interrupt waiting state if said key interrupt signal indicates the teletext mode.

13. The method of claim 5, wherein the step of determining a specified operating mode and function includes the substeps of:

setting the receiving system to a "2" mode state to perform various memo data functions; and setting the system to a key interrupt waiting state if said key interrupt signal indicates the memo data mode.

14. The method of claim 7, wherein the step of executing a program for fetching the memo data includes the substeps of:

reading the memo data from said memory;

setting a memo display flag of the memory to "1";

executing a memo screen display routine in the memory;

setting a memo mode state flag of the memory to "2"; and returning to a memo data display routine.

15. The method of claim 7, wherein the step of executing a program for editing the memo data includes the substeps of:

reading the memo data from said memory;

setting a memo displaying flag of the memory to "1";

executing a memo screen display routine in the memory;

setting a memo mode state flag of the memory to "1"; and returning to a memo data display routine.

16. The method of claim 7, wherein the step of determining a specified operating mode and function includes the substeps of;

setting a memo display flag of the memory to "2";

setting a memo mode state flag of the memory to "3"; and returning to a memo data display, routine.

17. The method of claim 8, wherein the step of executing a program for displaying a cursor includes the substeps of:

executing a cursor display routine in the memory;

setting a memo mode state of the memory to "1"; and returning to a cursor display routine.

18. The method of claim 8, wherein the step of executing a switching a German mode to an English mode and vice versa if said key interrupt signal indicates such switching;

executing a character data input and display routine in the memory if said key interrupt signal indicates no such switching;

setting a memo mode state of the memory to "1"; and returning to a character display routine.

19. The method of claim 9, wherein the step of setting the receiving system to the television mode includes the substeps of setting parameters relating to such mode setting in said memory to an inactive state and returning to a memo data display routine.

20. The method of claim 10, wherein the step of setting the receiving system to the television mode includes the substeps of setting parameters relating to such mode setting in said memory to an inactive state and returning to memo display routine.

21. The method of claim 10, wherein the step of determining whether said key interrupt signal indicates a cursor down includes the substeps of:

setting a memo identification mode of the memory of the memory to "φ" if said key interrupt signal indicates memo identification and "1" if it indicates no such memo identification;

setting a memo mode state of the memory to "3"; and returning to a memo data display mode.

22. A method of storing and editing memo data in a television receiving system having teletext function, said receiving system being capable of performing various television, teletext and memo data functions and operable in television, teletext and memo data modes, said system having television screen for displaying video images and a memory for storing various programs for enabling said various functions to be performed, comprising the steps of:

providing key interrupt signals representing said operating modes and functions;

determining whether said key interrupt signal indicates character completion or numbers; and executing a program in the memory for generating characters if said key interrupt signal indicates a character key.

23. A method of storing and editing memo data in a television receiving system having teletext function, said receiving system being capable of performing various television, teletext and memo data functions and operable in television, teletext and memo data modes, said system having a television screen for displaying video images and a memory for storing various programs for enabling said various functions to be performed, comprising the steps of:

providing key interrupt signals representing said operating modes and functions;

determining a specified operating mode and function to be performed from said key interrupt signal;

determining whether said key interrupt signal indicates character completion or numbers; and executing a program in the memory for displaying English characters if said key interrupt signal indicates an English character key; and executing a program in the memory for displaying German characters if said key interrupt signal indicates a German character key.

24. The method of claim 22 or 23, wherein the step of determining whether said key interrupt signal indicates character completion or numbers includes the substeps of:

setting a first code parameter in the memory to a "φ" state if said key interrupt signal does not indicate the character completion or numbers or storing of a number key signal, setting a character completion parameter in the memory to a "1" state, and setting a key input state parameter to a "φ" state, if said key interrupt signal indicates a number key, executing a character display routine; and returning the receiving system to a "φ" mode state.

25. The method of claim 25, wherein the step of executing a program for displaying English characters includes the substeps of:

setting a first code parameter in the memory to a "φ" state and a character completion parameter to a "2" state for displaying English characters and special characters on the television screen, and a key input state parameter in the memory to a "φ" state for processing a next key signal in a key input state "φ" routine, if said key interrupt signal indicates no character key or storing of an English character or special character;

executing a character display routine in the memory;

returning the receiving system to a "φ" mode state.

26. The method of claim 23, wherein the step of executing a program in the memory for displaying German characters includes the substeps of:

setting a first code parameter in the memory to a "φ" state, a character completion parameter to a "2" state for displaying German characters and special characters on the television screen and a key input state parameter in the memory to a "φ" state for processing a next key signal in a key input state "φ" routine;

executing a character display routine; and returning the system to a "φ" mode state.

27. The method of claim 14 or 15, wherein said memo data display routine includes routines associated with a pertinent program module fetching, and memo data screen display and character display on the television screen.

28. The method of claim 27, wherein said routine associated with character display on the television screen includes the subroutines for comparing row and column counted values indicating character display positions on the television screen; and determining a character mode.

29. The method of claim 27, wherein said routine associated with module fetching includes the subroutines for determining addresses in the memory to store data associated with a background display for the memo data on the television screen, storing said addresses in a buffer memory, reading said addresses from said buffer memory; finding a jump address; fetching said module; and executing a teletext figure and character display routine to display corresponding memo data.

30. The method of claim 28, wherein said subroutine for determining a character mode includes the subsubroutines for:

switching a current character mode into another character mode if a first code parameter in the memory indicates a number code:

setting a character completion parameter in the memory to a "1" state;

executing a character display routine for displaying the number code;

determining whether the first code parameter indicates a English or German character if it indicates no number code;

setting the receiving system to an English character mode if the first code parameter indicates a English character code;

setting the character completion parameter to a "2" state;

executing the character display routine for displaying the English character code;

returning to the character display routine, or setting the receiving system to a German mode if said first code parameter indicates a German character code;

setting the character completion parameter to a "3" state; and executing the character display routine for displaying the German character code.

31. The method of claim 24, wherein said character display routine includes the subroutines for:

displaying numbers on the television screen;

displaying characters on the television screen; and clearing all characters from the television screen.

32. The method of claim 31, wherein said subroutine for displaying numbers includes the subroutines for detecting whether the present character completion parameter is set to the "1" state;

executing a display routine for each character font; and returning to the character display routine.

33. The method of claim 31, wherein said subroutine for displaying characters on the television screen includes the subsubroutines for storing in the memory the font of each English character if the present character completion parameter in the memory is set to the "2" state; executing the character display routine for each character font; and returning to the character display routine.

34. The method of claim 31, wherein the subroutine for displaying characters on the television screen includes the subsubroutines for storing in the memory the font of each German character code if the present character completion parameter is not set to the "φ" state; and executing the character display routine for each character font; and returning to the character display routine.

35. The method of claim 31, wherein the subsubroutine for clearing all characters from the television screen includes the routines for:

detecting whether a erasing flag of the system is set to a "1" state if the character completion parameter is set to the "φ" state;

obtaining an X coordinate if the erasing flag is set to the "1" state and the first code parameter is set to a "null " state;

loading an address of the font to be displayed in the memory;

setting the erasing flag to the "φ" state;

obtaining an Y coordinate executing a display routine for each character font;

loading the address of the font if said first code parameter is not set to the null state;

obtaining an Y coordinate if the erasing flag is not set to the "1" state and executing the display routine for each character font; and returning to the beginning of the character display routine.

36. The method of claim 17, wherein said cursor display routine includes the subroutines for processing a cursor up key, a cursor down key, a cursor left key, and a cursor right key during a key interrupt disable state.

37. The method of claim 36, wherein said subroutine for processing a cursor up key includes the subsubroutines for:
displaying a character font if a present column counted value is equal to an initially set value;
returning to the cursor display routine or decreasing the present column counted value by unity if the present column counted value is not equal to the initially set value; executing a character display routine for the character font; and
returning to the cursor display routine.

38. The method of claim 36, wherein said subroutine for processing a cursor down key includes the subsubroutines for:
displaying a character font if a column counted value is equal to a maximum column counted value;
returning to the cursor display routine, or increasing the present column counted value by unity if the present column counted value is not equal to the maximum column counted value;
executing a displaying routine for the character font; and
returning to the cursor display routine.

39. The method of claim 36, wherein said subroutine for processing a cursor left key includes the subsubroutines for:
displaying a character font if a row counted value is equal to an initially set value;
returning to the cursor display routine or decreasing the present row counted value by unity if the row counted value is not equal to the initially set value;
executing a display routine for the character font; and
returning to the cursor display routine.

40. The method of claim 36, wherein said subroutine for processing a cursor right key includes the subsubroutines for:
displaying a character font if a row counted value is equal to a maximum row counted value;
returning to the cursor display routine or increasing the present row counted value by unity if the row counted value is not equal to the maximum row counted value;
executing a character display routine for the character font; and
returning to the cursor display routine.

41. A method of storing and editing memo data in a television receiving system having teletext function, said receiving system being capable of performing various television, teletext and memo data functions and operable in television, teletext and memo data modes, said system having a television screen for displaying video images and a memory for storing various programs for enabling said various functions to be performed, comprising the steps of:
establishing X and Y coordinates corresponding to a position of a character displayed on the television screen;
storing character font data corresponding to said character displayed in a first register;
shifting the content of the first register to detect the carry value;
storing the carry value of a second register at a XCDP register, a YCDP register and a DRAM register;
converting the carry value of the second register representing display and background colors to analog chrominance signals of red, green and blue;
detecting an X counted value;
detecting an Y counted value; and
determining whether or not the Y counted value is a predetermined value.

42. The method of claim 41, wherein the step of establishing X and Y coordinates includes the substeps of:
assigning a present row counted value to the X coordinate and a present column counted value to the Y coordinate; and
storing a predetermined value in X and Y counters constituting a loop counter.

43. The method of claim 41, wherein the step of detecting the carry value includes the substeps of:
shifting the content of the first register toward left by one bit;
storing the background color at the upper 4 bits of the second register B if the carry value of the one bit shifted content of the second register is $\phi$;
storing the display color at the lower 4 bits of the second register if the carry value of the one bit shifted content of the second register is 1;
shifting the content of the first register toward left by one bit;
storing the background color at the upper 4 bits of the second register if the carry value of the one bit left shifted content of the first register is $\phi$; and
storing the displaying color at the lower 4 bits of the second register if the carry value of the one bit left shifted content of the first register is 1.

44. The method of claim 41, wherein the step of converting the carry value includes the substeps of:
storing the carry value of the displaying and background colors at addresses of a memory specified by the XCDP and YCDP registers;
converting said stored value to analog signals; and
increasing the X coordinate by two bits when displaying of 2 dots in the X-coordinate on the television screen is completed.

45. The method of claim 41, wherein the step of determining whether the Y counted value is a predetermined value includes the substeps of:
decreasing the counted value of the X and Y coordinates by 16 and 1, respectively, if said decreased counted value of the Y coordinate is not $\phi$; and
storing two bytes of said character font data in said first register.

46. A method of storing and editing memo data in a television receiving system having teletext function, said receiving system being capable of performing various television, teletext and memo data functions and operable in television, teletext and memo data modes, said system having television screen for displaying video images and a memory for storing various programs for enabling said various functions to be performed, comprising the steps of:
providing the memo data and information representing specific functions to be performed from a controller detachable from the rest of the television receiving system;
storing, fetching and editing memo data to display the memo data on the TV screen;
forming characters associated with the memo data on the television screen;
clearing said characters from the screen;
providing a position of a cursor up, cursor down, cursor left and cursor right;
switching between different language modes; and
forming character fonts.

* * * * *

UNITED STATES PATENT AND TRADEMARK OFFICE
CERTIFICATE OF CORRECTION

PATENT NO. : 5,181,113
DATED : January 19, 1993
INVENTOR(S) : Dong Ho Chang

It is certified that error appears in the above-identified patent and that said Letters Patent is hereby corrected as shown below:

Claim 9, column 16, lines 19-20, delete "program for switching character mode includes the substeps of:"

Claim 9, column 16, line 39, change "say" to --said--.

Claim 18, column 18, line 3, after "a", insert --program for switching character mode includes the substeps of :--.

Claim 35, column 20, line 62 and 66 change "an Y" to --a Y --.

Claim 41, column 22, line 5, change "an Y" to --a Y--.

Signed and Sealed this

First Day of February, 1994

Attest:

BRUCE LEHMAN

Attesting Officer     Commissioner of Patents and Trademarks